United States Patent
Noack et al.

(10) Patent No.: US 8,802,265 B2
(45) Date of Patent: Aug. 12, 2014

(54) METHOD FOR STORING ELECTRICAL ENERGY IN IONIC LIQUIDS

(75) Inventors: Jens Noack, Pfinztal (DE); Jens Tübke, Waldbronn (DE); Karsten Pinkwart, Pfintzal (DE)

(73) Assignee: Fraunhofer-Gesellschaft zur Forderung der Angewandten Forschung E.V. (DE)

( * ) Notice: Subject to any disclaimer, the term of this patent is extended or adjusted under 35 U.S.C. 154(b) by 179 days.

(21) Appl. No.: 13/201,813

(22) PCT Filed: Feb. 15, 2010

(86) PCT No.: PCT/EP2010/051872
§ 371 (c)(1),
(2), (4) Date: Oct. 31, 2011

(87) PCT Pub. No.: WO2010/094657
PCT Pub. Date: Aug. 26, 2010

(65) Prior Publication Data
US 2012/0115069 A1    May 10, 2012

(30) Foreign Application Priority Data
Feb. 18, 2009   (DE) .......................... 10 2009 009 357

(51) Int. Cl.
*H01M 8/18*  (2006.01)
(52) U.S. Cl.
USPC ........................ 429/105; 429/498; 429/188
(58) Field of Classification Search
USPC .......................................... 429/105, 188, 498
See application file for complete search history.

(56) References Cited

U.S. PATENT DOCUMENTS

| | | | |
|---|---|---|---|
| 4,786,567 A | | 11/1988 | Skyllas-Kazacos et al. |
| 2001/0028977 A1* | | 10/2001 | Kazacos et al. ............... 429/105 |
| 2003/0143456 A1* | | 7/2003 | Kazacos et al. ............... 429/105 |
| 2006/0234113 A1 | | 10/2006 | Rohrl |
| 2007/0139862 A1* | | 6/2007 | Tateishi et al. ................ 361/502 |
| 2008/0070076 A1 | | 3/2008 | Makita et al. |
| 2010/0137175 A1* | | 6/2010 | Kunz et al. .................... 508/463 |

FOREIGN PATENT DOCUMENTS

| | | |
|---|---|---|
| DE | 10061959 A1 | 6/2002 |
| EP | 0729648 B1 | 4/2003 |
| EP | 1793389 A1 | 6/2007 |
| JP | 2001189156 | 10/2001 |
| JP | 2010086935 | 4/2010 |
| WO | WO 2008135482 A2 * | 11/2008 |

OTHER PUBLICATIONS

Galinksi et al. "Ionic Liquids as Electrolyte" Electrochimica Acta 51, pp. 5567-5580 (available online Apr. 19, 2006).*
Katayama Y. et al. "Redox reaction in 1-ethyl-methylimidazolium-iron chlorides molten salt system for battery application" Journal of Power Sources, vol. 109, Issue 2, 2002.

* cited by examiner

*Primary Examiner* — Gregg Cantelmo
(74) *Attorney, Agent, or Firm* — Price Heneveld LLP

(57) ABSTRACT

A redox flow battery having an electrolyte which includes at least one ionic liquid, wherein the anion of the ionic liquid(s) is selected from a halide, a phosphate, a nitrite, a nitrate, a sulfate, a hydrogensulfate, a carbonate, a hydrogencarbonate, a phosphonate, a phosphinate, a sulfonate, a carboxylate, an imide, a methide and mixtures thereof.

17 Claims, 2 Drawing Sheets

METHOD FOR STORING ELECTRICAL ENERGY IN IONIC LIQUIDS

Figure 1:
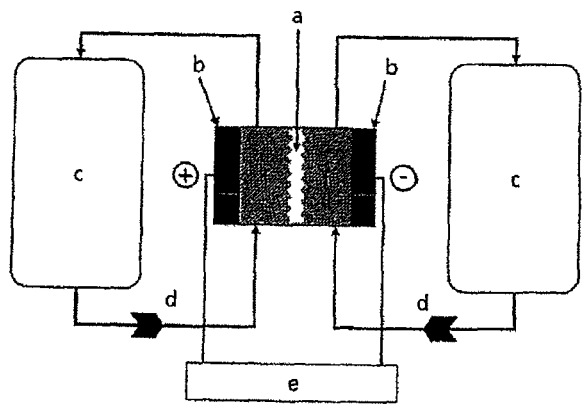

Electrical energy can be stored by various processes. One option is the conversion of electrical energy to chemical energy by chemical reactions at electrode surfaces by electrical current. This method of storing energy is utilized industrially on a large scale in secondary batteries (accumulators).

A secondary battery is an electrochemical cell consisting of two half-cells which are in turn separated by an ion-conducting separator. The separator ensures charge balance, but prevents mass transfer between the half-cells. During the storage operation, a reduction of the active substance takes place in the negative half-cell, and an oxidation in the positive half-cell. In the storage operation, electrons thus flow from the positive half-cell into the negative half-cell, and in the reverse direction in the discharging operation.

In order to enable balancing of the charge and movement of the ions, a liquid substance or substance mixture, referred to as electrolyte, is needed in both half-cells as an ion conductor. The electrode is the phase boundary between electrical conductor and ionic conductor. The active material may be the electrode itself, a substance dissolved in the electrolyte or substances intercalated into the electrode material.

If the active material of negative electrolyte (anolyte) and positive electrolyte (catholyte) consists of substances dissolved in the electrolyte, the case arises in this type of battery that the amount of energy and power can be scaled independently of one another, since the electrolyte can be conducted from reservoir vessels past the electrodes. This type of electrochemical energy store is called a redox flow battery.

The general chemical reactions are as follows:

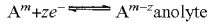
$A^m + ze^- \rightleftharpoons A^{m-z}$ anolyte

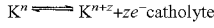
$K^n \rightleftharpoons K^{n+z} + ze^-$ catholyte

The electrolyte of redox flow batteries consists typically of mineral acids or organic acids dissolved in water. As a result of the use of water as a constituent of the electrolyte, a potential window of approx. −0.5 V to 1.2 V is possible with graphite electrodes relative to a standard hydrogen electrode. Beyond these limits referred to as the potential window, decomposition of water sets in, and hence destruction of the water-based electrolyte, evolution of gas and loss of efficiency. The overall voltage of a water-based redox flow battery with graphite electrodes is thus limited to max. 1.7 V.

However, there exist combinations of redox pairs in which a higher voltage than 1.7 V is established. In order to be able to use these combinations of redox pairs as electrochemical energy stores, it is necessary to use nonaqueous electrolytes, as is possible with organic acids, or to find new electrode materials with a higher potential window. Because $P=U*I$, the increase in the voltage is associated with a rising power density and, because $W=U*I*t$, a rise in energy density is possible.

The energy density of redox flow batteries depends on the solubility of the redox pairs. For a maximum energy density, the redox pairs are at the limit of solubility in the electrolyte. One type of redox flow battery is the vanadium redox flow battery. The reaction equation of such a vanadium redox flow battery is as follows:

$VO_2^+ + 2H^+ + V^{2+} \rightleftharpoons VO^{2+} + H_2O + V^{3+}$

In this electrochemical energy store, vanadium is used in different oxidation states in the positive (catholyte) and in the negative (anolyte) electrolytes. In the case of use of aqueous sulphuric acid as the solvent, the concentration of vanadium is limited to approx. 1.6 mol/l. The reason for this lies in the limited solubility of divanadyl cations ($VO_2^+$) in aqueous sulphuric acid. At temperatures above 40° C., according to the equation, as a function of time and the ratio of vanadyl/divanadyl cations ($VO^{2+}/VO_2^+$), solid vanadium pentoxide ($V_2O_5$) forms from dissolved divanadyl cations ($VO_2^+$) in the catholyte and is no longer available for the chemical reactions, thus reducing the power and capacity of the store and causing a pressure rise in the catholyte as a result of the filtering effect of the graphite felt in the positive half-cell.

$2VO_2^+ + H_2O \rightleftharpoons V_2O_5 \downarrow + 2H^+$

Divanadyl cations ($VO_2^+$) form in a vanadium redox flow battery during the charging operation according to the following reaction equation:

$VO^{2+} + H_2O \rightleftharpoons VO_2^+ + e^- + 2H^+$

In aqueous systems, carbon in its diamond, graphite and glassy carbon polymorphs has a great electrochemical potential window. Electrode materials with a comparable potential window must not enter into any passivating layers or side reactions. For this reason, it is customary in redox flow batteries to use graphite electrodes in order to prevent decomposition of water. On the other hand, organic acids, for example methane-sulphonic acid, are used as an electrolyte constituent, in order to be able to use redox pair combinations beyond the limit of 1.7 V.

The electrochemical potential window, i.e. the voltage range between formation of oxygen and hydrogen, i.e. the decomposition (electrolysis) of water in relation to the standard hydrogen electrode, depends on the material of the electrode. Metallic electrodes usually have a much lower potential window than carbon-based electrodes composed of graphite, or form passivating, i.e. performance-reducing, layers. Since, however, an electrochemical potential window of maximum width is required for use of redox pairs, as already explained above, carbon is employed in its diamond, graphite and glassy carbon polymorphs. Pure graphite electrodes have a much lower stability and electrical conductivity compared to metals. To increase the stability, composite materials composed of graphite/polymer mixtures are used. However, the use of polymers leads in turn to a decrease in the electrical conductivity and hence to performance losses as a result of resistance losses.

Generally, the energy density of a redox flow battery depends directly on the solubility of the redox pairs in the electrolyte. In order to increase the solubility, acids or bases are used in relatively high concentrations as constituents of the electrolyte, or stabilizers are added.

As already discussed above, the precipitation of vanadium pentoxide is a problem in vanadium redox flow batteries. In order to prevent such precipitation of vanadium pentoxide, four measures are particularly employed in the prior art.

1. The working temperature of the battery system is fixed between 0° C.<T<40° C. At T<0° C., the aqueous electrolyte begins to be converted to the solid state, the viscosity of the electrolyte increasing from the working range with falling temperature. Freezing of the electrolyte causes destruction of the battery. At temperatures above 40° C., irreversible precipitation of solid vanadium pentoxide arises. Restriction of the temperature within this working range means monitoring the temperature and regulating the temperature of the system. Firstly, it has to be ensured, for example by heating, that the electrolyte does not freeze and hence the system is destroyed, and, secondly, the temperature in the reaction space must not rise above 40° C. It may be necessary to ensure this by cooling.

2. The precipitation of solid vanadium pentoxide depends on the ratio of vanadyl/divanadyl cations. The higher the concentration of divanadyl cations, which increases in the charging operation, the higher the probability of precipitation of solid vanadium pentoxide even within the temperature limits of 0° C.<T<40° C. For this reason, at a vanadium concentration of >1.6 mol/l in the charging operation, only up to approx. 80% of the vanadyl cations are converted to divanadyl cations, corresponding to a charge state of 80%.

3. The standard concentration of the vanadium electrolyte is 1.6 mol/l in 3 M sulphuric acid ($H_2SO_4$). This constitutes a compromise between elevated viscosity at higher sulphuric acid concentrations (elevated energy expenditure for pumps, and hence loss of efficiency) and energy density. Within the temperature limits, the precipitation of vanadium pentoxide is prevented by approx. 0.05 mol/l phosphoric acid.

4. An increase in the concentration of sulphuric acid in the electrolyte enables a slightly higher solubility of vanadyl/divanadyl cations. The limits here are approx. 2 M vanadium in 4-5 M sulphuric acid.

The measures outlined above therefore lead to impairments in the operation of a vanadium redox flow battery.

In this context, it should also be noted that, according to the VAN'T HOFF RULE (RGT rule), an increase in the temperature by 10 K causes the reaction rate of chemical reactions to increase by about twofold. An increase in the reaction rate is associated with an increase in the power density. Redox flow batteries work, as far as possible, at temperatures above room temperature. The vanadium redox flow battery is restricted to a temperature of not more than 40° C. by the precipitation of vanadium pentoxide.

In general, the working temperature is limited to well below the boiling temperature of the electrolyte since the rapidly rising partial pressure of the electrolyte causes a pressure buildup to set in in the overall system, which can lead to leaks, and the electrolyte can no longer be involved in the reaction. Therefore, the currently customary redox flow batteries can be operated only in a quite limited temperature range.

It is an object of the present invention to provide a redox flow battery in which the above-described disadvantages are very substantially avoided and improved variability in the selection of the operating parameters, for example operating temperature or selection of the electrode material, is enabled.

This object is achieved in accordance with the present invention by the provision of a redox flow battery comprising an electrolyte which comprises at least one ionic liquid.

In the context of the present invention, the term "redox flow battery" is used in its usual meaning. The basic structure of a redox flow battery is known to those skilled in the art.

The redox flow battery stores electrical energy in chemical compounds and is therefore related to the accumulators. In contrast to conventional accumulators, the two energy-storing electrolytes circulate in two separate circuits between which an exchange of charge is possible in the battery by means of a membrane or separator. The electrolytes are stored outside the battery in separate vessels or tanks, as a result of which the energy stored no longer depends on the size of the cell, and hence energy and power can be scaled separately.

In unison with a conventional redox flow battery, the inventive redox flow battery therefore has a positive half-cell, a negative half-cell, a separator which separates the two half-cells, two electrodes, and two electrolyte vessels outside the cells.

As already discussed above, the separator ensures charge balance, but prevents mass transfer between the half-cells. During the storage operation, a reduction of the active substance takes place in the negative half-cell, and an oxidation in the positive half-cell. In the storage operation, electrons thus flow from the positive half-cell to the negative half-cell, and in reverse direction in the discharging operation.

FIG. 1 shows, by way of example, the basic structure of a redox flow battery with (a) an ion-conducting separator, (b) electrodes, (c) electrolyte vessels, (d) electrolyte pumps, (e) an electrical source/sink and (f) positive and negative half-cells.

In the context of the present invention, the term "ionic liquid" is used in its usual meaning, i.e. ionic liquids are understood to mean organic ionic compounds composed of an organic or inorganic anion and a voluminous organic cation. If the ionic liquid is in molten form below 100° C., reference is made to RTILs (room temperature ionic liquids).

Typical properties of ionic liquids are
high chemical stability,
a wide potential window (high electrochemical stability),
high ionic conductivity,
low vapour pressure,
noncombustible,
high thermal stability.

The great range of variation in the organic substituents and the multitude of possible combinations of anions and cations allow the physicochemical properties of ionic liquids to be influenced within a wide range or matched to applications in a controlled manner.

Preferably, both (i.e. the positive and negative) half-cells of the redox flow battery comprise an ionic liquid, and the ionic liquids may be the same or different.

In a preferred embodiment, the electrolyte contains less than 0.05% by weight of water, more preferably less than 0.02% by weight and even more preferably less than 0.01% by weight of water.

The electrolyte is preferably anhydrous.

As a result of the use of anhydrous electrolytes, a greater electrochemical potential window is achievable than in the case of water-based redox flow batteries. With increasing voltage, the power and the energy density of the system increase.

The content of ionic liquid in the electrolyte can be varied over a wide range and is preferably in the range from 0.1 to 100% by weight. The electrolyte of the inventive redox flow battery preferably consists to an extent of at least 80% by weight, more preferably to an extent of at least 90% by weight and more preferably to an extent of 100% by weight of the ionic liquid(s).

The anion of the ionic liquid(s) is preferably selected from halide, phosphate, for example hexafluorophosphate, arsenate, antimonite, nitrite, nitrate, sulfate for example sulfate, hydrogensulfate, carbonate, hydrogencarbonate, phosphonate, phosphinate, boarate, for example tetrafluoroborate, sulphonate, for example tosylate or methanesulphonate, carboxylate, for example formate, imide, for example bis(trifluoromethylsulphonyl)imide, methide and mixtures thereof.

Examples of preferred anions include: fluoride, hexafluorophosphate, hexafluoroarsenate, hexafluoroantimonate, trifluoroarsenate, nitrite, nitrate, sulfate, hydrogensulfate, carbonate, hydrogencarbonate, phosphate, hydrogenphosphate, dihydrogenphosphate, vinylphosphonate, dicyanamide, bis(pentafluoroethyl) phosphinate, tris(pentafluoroethyl)trifluorophosphate, tris(heptafluoropropyl)trifluorophosphate, bis[oxalate(2-)]borate, bis[salicylate(2-)]borate, bis[1,2-benzenediolato(2-)-O,$O^1$]borate, tetracyanoborate, tetrasubstituted borate of the general formula [$BR_aR_bR_cR_d$]$^-$, where $R_a$ to $R_d$ are each independently fluorine or a carbon-containing organic saturated or unsaturated, acyclic or cyclic, aliphatic, aromatic or araliphatic radical which has 1 to 30 carbon atoms and may contain one or more heteroatoms and/or be substituted by one or more functional groups or halogen, Organic sulfonate of the general formula $[R_e—SO_3]^-$, where $R_e$ is a carbon-containing organic saturated or unsaturated, acyclic or cyclic, aliphatic, aromatic or araliphatic radical which has 1 to 30 carbon atoms and may contain one or more heteroatoms and/or be substituted by one or more functional groups or halogen, carboxylate of the general formula $[R_f—COO]^-$, where $R_f$ is hydrogen or a carbon-containing organic saturated or unsaturated, acyclic or cyclic, aliphatic, aromatic or araliphatic radical which has 1 to 30 carbon atoms and may contain one or more heteroatoms and/or be substituted by one or more functional groups or halogen, (fluoroalkyl)fluorophosphate, imide of the general formula $[R_g—SO_2—N—SO_2—R_h]^-$, $[R_i—SO_2—N—CO—R_j]^-$ or $[R_k—CO—N—CO—R_l]^-$, where $R_g$ to $R_l$ are each independently hydrogen or a carbon-containing organic saturated or unsaturated, acyclic or cyclic, aliphatic, aromatic or araliphatic radical which has 1 to 30 carbon atoms and may contain one or more heteroatoms and/or be substituted by one or more functional groups or halogen;

methide of the general formula

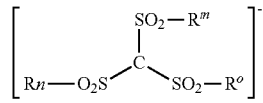

where $R_m$ to $R_o$ are each independently hydrogen or a carbon-containing organic saturated or unsaturated, acyclic or cyclic, aliphatic, aromatic or araliphatic radical which has 1 to 30 carbon atoms and may contain one or more heteroatoms and/or be substituted by one or more functional groups or halogen;

Organic sulfate of the general formula $[R_pO—SO_3]^-$ where $R_p$ is a carbon-containing organic saturated or unsaturated, acyclic or cyclic, aliphatic, aromatic or araliphatic radical which has 1 to 30 carbon atoms and may contain one or more heteroatoms and/or be substituted by one or more functional groups or halogen.

The cation of the ionic liquid(s) is preferably selected from imidazolium, pyridinium, pyrazolium, quinolinium, thiazolium, triazinium, pyrrolidinium, phosphonium, ammonium, sulphonium and mixtures thereof.

Examples of preferred cations of the ionic liquid include:

quaternary ammonium cations of the general formula $[NR_1R_2R_3R_4]^+$ where $R_1$, $R_2$, $R_3$, $R_4$ may be the same or different and are each $C_{1-12}$-alkyl or phenyl-$C_{1-4}$-alkyl, and/or R1 and R2 together are a substituted or unsubstituted $C_{4-5}$-alkenylene radical;

quaternary phosphonium cations of the general formula $[PR_1R_2R_3R_4]^+$ where $R_1$, $R_2$, $R_3$, $R_4$ may be the same or different and are each $C_{1-12}$-alkyl or phenyl-$C_{1-4}$-alkyl, and/or R1 and R2 together are a substituted or unsubstituted $C_{4-5}$-alkenylene radical;

imidazolium cations of the general formula

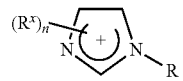

pyridinium cations of the general formula

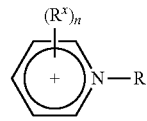

pyrazolium cations of the general formula

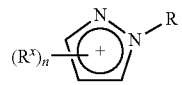

quinolinium cations of the general formula

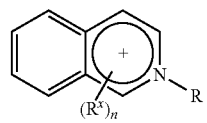

thiazolium cations of the general formula

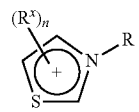

triazinium cations of the general formula

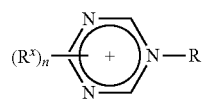

where n, R and $R^x$ are each defined as follows:
n is 0, 1, 2, 3 or 4;
R is hydrogen, $C_{1-12}$-alkyl or phenyl-$C_{1-4}$-alkyl;
$R^x$ is a $C_{1-6}$-alkyl, halogen, amino, cyano, $C_{1-4}$-alkoxy, carboxylate or sulfonate.

Ionic liquids offer the possibility of dissolving redox pairs and using them as electrolyte in redox flow batteries.

The redox pair for the positive half-cell is preferably selected from $V^{4+}/V^{5+}$, $F_2/F^-$, $O_2/O^{2-}$, $O_3/O_2$, $Ag^{2+}/Ag^+$, $Co^{3+}/Co^{2+}$, $N_2O/N_2$, $Ce^{4+}/Ce^{3+}$, $Au^+/Au$, $Mn^{7+}/Mn^{4+}$, $Ni^{4+}/Ni^{2+}$, $Mn^{3+}/Mn^{2+}$, $Pb^{4+}/Pb^{2+}$, $Au^{3+}/Au^+$, $Cl_2/Cl^-$, $Tl^{3+}/Tl^{2+}$, $Mn^{4+}/Mn^{2+}$, $Cu^{2+}/Cu^+$, $Pu^{5+}/Pu^{4+}$, $Br_2/Br^-$, $I^{5+}/I^-$, $Fe^{3+}/Fe^{2+}$, $Pu^{4+}/Pu^{3+}$, $Hg^{2+}/Hg_2^{2+}$, $Hg^{2+}/Hg$, $U^{5+}/U^{4+}$, $Ag^{2+}/Ag^+$, $V^{4+}/V^{3+}$, $Ru^{3+}/Ru^{2+}$, $Sn^{4+}/Sn^{2+}$, $Cl_2/Cl^-$ and $I_2/I^-$.

The redox pair for the negative half-cell is preferably selected from $V^{3+}/V^{2+}$, $Np^{4+}/Np^{3+}$, $Sn^{4+}/Sn^{2+}$, $Sr^{2+}/Sr$, $Ba^{2+}/Ba$, $Ce^{3+}/Ce$, $Zn^{2+}/Zn$, $As^{5+}/As^{3+}$, $U^{4+}/U^{3+}$, $Sb^{5+}/Sb^{3+}$, $S^{4+}/S^{2+}$, $Ti^{4+}/Ti^{2+}$, $In^{3+}/In^{2+}$, $Ni^{4+}/Ni^{2+}$, $S/S^{2-}$, $Cr^{3+}/Cr^{2+}$, $In^{2+}/$ $In^+$, $Ti^{3+}/Ti^{2+}$, $Eu^{3+}/Eu^{2+}$, $Pb^{2+}/Pb$, $Tl^+/Tl$, $Ti^{4+}/Ti^{3+}$, $Na^+/Na$, $Li^+/Li$, $K^+/K$, $Mg^+/Mg$, $Mg^{2+}/Mg$, $Ca^+/Ca$, $Ca^{2+}/Ca$, $Sr^+/Sr$ and $Be^{2+}/Be$.

In a preferred embodiment, the redox flow battery is a vanadium redox flow battery, which means that the redox pair used for the positive half-cell is $V^{4+}/V^{5+}$, and the redox pair used for the negative half-cell is $V^{3+}/V^{2+}$.

In further preferred embodiments, the following redox flow batteries can be mentioned by way of example:
  iron-chromium redox flow battery
    positive half-cell: $Fe^{2+}/Fe^{3+}$;
    negative half-cell: $Cr^{2+}/Cr^{3+}$
  cerium-vanadium redox flow battery
    positive half-cell: $Ce^{3+}/Ce^{4+}$;
    negative half-cell: $V^{2+}/V^{3+}$
  iron-titanium redox flow battery
    positive half-cell: $Fe^{2+}/Fe^{3+}$;
    negative half-cell: $Ti^{3+}/Ti^{4+}$
  polysulphide-bromide redox flow battery
    positive half-cell: $Br_2/Br^-$;
    negative half-cell $S_4^{2-}/S_2^{2-}$
  vanadium-bromide redox flow battery
    positive half-cell: $Br_2/Br^-$;
    negative half-cell: $V^{2+}/V^{3+}$
  zinc-bromine redox flow battery
    positive half-cell: $Zn/Zn^{2+}$;
    negative half-cell: $Br_2/Br^-$ In a preferred embodiment, the vanadium redox flow battery has an operating temperature in the range from −30° C. to 400° C., more preferably in the range from −20° C. to 200° C. In a preferred embodiment, the operating temperature of the vanadium redox flow battery is above 40° C., even more preferably above 50° C.

Preferably, the concentration of the vanadium ions in the electrolyte in the vanadium redox flow battery is in the range from 0.1 mol/l to 10 mol/l, even more preferably in the range from 0.1 mol/l to 5 mol/l. In a preferred embodiment, the concentration of the vanadium ions in the electrolyte is above 2 mol/l, even more preferably above 3 mol/l.

As already discussed above, solid vanadium pentoxide is formed in the conventional vanadium redox flow battery at temperatures above 40° C. and concentrations of vanadium above 1.6 mol/l. As a result of the use of ionic liquids, preferably anhydrous ionic liquids, the formation of solid vanadium pentoxide does not take place. It is thus possible to achieve higher concentrations of vanadium in the electrolyte. This leads to higher energy densities in a vanadium redox flow battery. In addition, the working range of the battery can be extended above 40° C., which leads to a higher power density.

Ionic liquids have different melting and boiling points from water and acids and bases dissolved in water. This gives rise to different working ranges which cannot be attained with aqueous electrolytes. For instance, it is possible to achieve operating temperatures well above the boiling point of water (100° C.), combined with higher power densities. Any cooling and monitoring devices can be dispensed with. It is likewise possible with ionic liquids to attain operating temperatures below the freezing point of water (0° C.). This allows any heating of the system to be dispensed with.

In a preferred embodiment, the redox pair is formed by the ionic liquid in at least one half-cell, preferably in both half-cells, of the redox flow battery.

Ionic liquids can themselves form the redox pairs. As a result, it is no longer necessary to dissolve substances as redox pairs up to the limit of their solubility in a liquid, but rather it is possible to use the solvent itself as the electrolyte and redox pair.

This offers the advantage that the energy density of the system no longer depends on the solubility of the redox pairs it the electrolyte and the voltage, but rather on the molar mass of the ionic liquids and the voltage which is established. It is thus possible to achieve much higher energy densities than in current systems with aqueous electrolytes.

In a preferred embodiment, the inventive redox flow battery has metallic electrodes. The metal is preferably selected from iron, iron alloys, copper, copper alloys, nickel, nickel alloys, zinc, zinc alloys, silver, silver alloys, aluminium, aluminium alloys.

The use of ionic liquids with a very low water content or anhydrous ionic liquids allows the decomposition of water to be completely or at least substantially avoided. The potential window is within the decomposition of the ionic liquids. In contrast to aqueous electrolytes, it is thus possible to use metallic electrodes.

Alternatively, the electrode in a further preferred embodiment consists of diamond or indium tin oxide (ITO). These electrode materials are chemically inert toward a multitude of substances, and mechanically stable.

The electrodes are either applied by means of known coating processes (e.g. CVD, PVD) to a suitable substrate or produced separately, and pressed with the substrate. The latter variant is used when no coating processes are available for the desired substrate.

To establish the desired electrical conductivity, electrodes of diamond are preferably doped with boron, nitrogen and/or phosphorus. The selection of the dopant and the degree of doping can be used to adjust the electrical conductivity.

In a preferred embodiment, the electrolyte of the inventive redox flow battery does not have any addition of stabilizers and/or acids or bases.

Redox pairs in ionic liquids have different solubilities from those in aqueous systems. In addition, the solubilities of the ionic liquids also differ very greatly from one another. Redox pairs can have a higher solubility in ionic liquids than would be possible in aqueous systems. Stabilizers or the addition of acids or bases can be dispensed with.

The separator between the two half-cells is preferably selected from NAFION; Fumasep FAP, FAD, FAB, FKE, FKS, FKB, FTCM-A, FTCM-E, FKL, FAA, FTAM-E, FTAM-A, FAS, FBM; microporous separators.

In a further aspect, the present invention relates to the use of an electrolyte which comprises an ionic liquid in a redox flow battery.

With regard to the preferred properties of the ionic liquid, of the electrolyte and of the redox flow battery, reference may be made to the above remarks.

The examples described hereinafter illustrate the present invention in detail.

EXAMPLES

In the example described hereinafter, 2-hydroxyethyl-ammonium formate was used as the ionic liquid and solvent for inorganic salts in a redox flow battery.

In each case 0.5 mol of vanadium(III) chloride ($VCl_3$) was dissolved in 2×50 ml of 2-hydroxyethylammonium formate. In the two solutions the trivalent vanadium was electrolytically reduced to $V^{2+}$ or oxidized to $V^{4+}$ at carbon electrodes by means of a flow cell. A further solution of 0.5 mol of $VCl_3$ in 50 ml of 2-hydroxy-ethylammonium formate served, with the electrolytically prepared $V^{4+}$ solution, as a starting electrolyte for the energy storage and energy withdrawal experiments.

Figure 2:
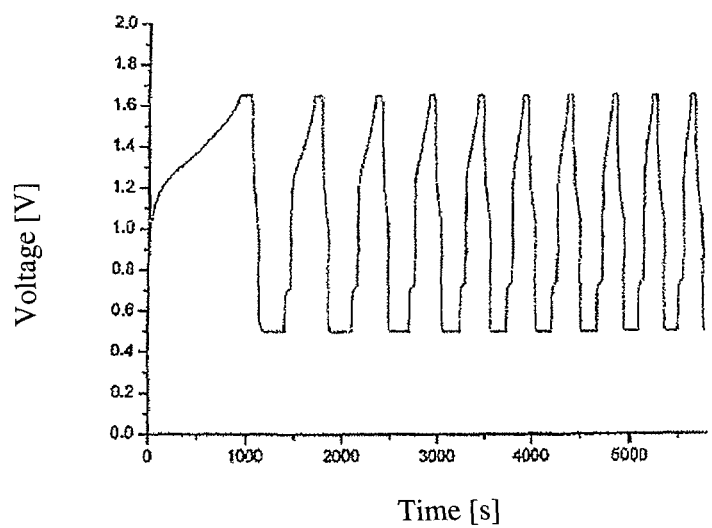

The $V^{3+}$ solution served as the anolyte and was introduced by means of a pump into the negative half-cell of an electrochemical flow cell. The $V^{4+}$ solution served as the catholyte and was introduced into the positive half-cell of the flow cell. The solutions were not subjected to any further pumping through the cell in circulation. By means of a battery test system, the cell was charged and discharged statically with a maximum current density of 5 mA/cm$^2$ within the limits of 0.5 V-1.65 V. Nearly 9000 cycles were completed. In FIG. 2, the voltage profile of the first 10 charging and discharging cycles is plotted.

Figure 3:
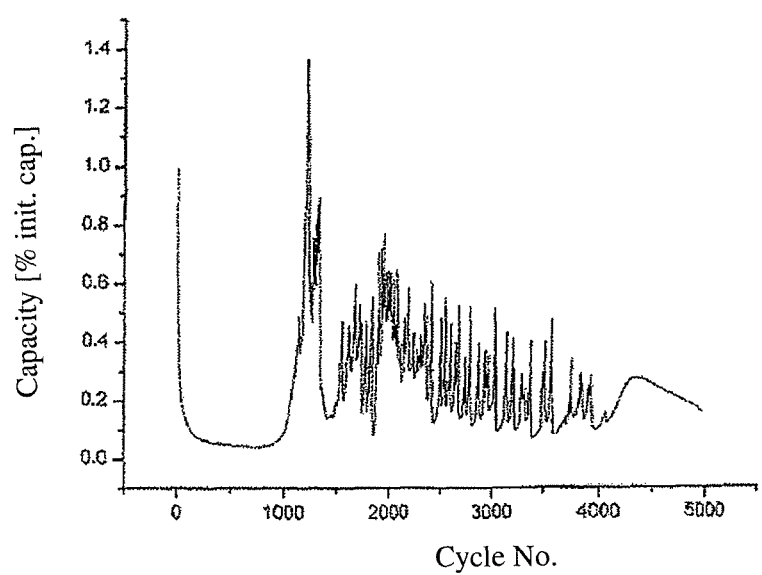

FIG. 3 shows the profile of the discharging capacity, based on the first discharging capacity, of the first 5000 charging and discharging cycles.

FIG. 2 shows the first ten charging and discharging curves of a steady-state vanadium redox flow battery with 2-hydroxyethylammonium formate as the solvent. The cell was charged galvanostatically with a constant current of 0.25 A up to a voltage of 1.65 V. This was followed by switching to potentiostatic charging at a voltage of 1.65 V up to a current of 0.15 A. This was followed immediately by the discharging operation. At a current of 0.25 A, the battery was discharged galvanostatically down to a voltage of 0.5 V. This was followed by potentiostatic discharging at a voltage of 0.5 V until a lower current limit of 0.15 A was attained. The discharging operation was followed by a step comprising the measurement of the terminal voltage for 60 seconds without load. In this step, the voltage of the battery rises to approx. 0.7 V. These charging/discharging cycles were conducted 5000 times as shown in FIG. 3. FIG. 3 shows the capacity calculated from the current, voltage and time measurements, based on the first discharge capacity. The discharge capacity of the first discharge operation in ampere hours (Ah) was set to 1 and the discharge capacity of the subsequent cycles was based on the first value. During the first 1000 cycles, a steep decline in the capacity is evident, but this subsequently recovers briefly to above the starting value. Even after 5000 cycles, a capacity of approx. 20% of the starting capacity is still measurable.

The invention claimed is:

1. A redox flow battery comprising an electrolyte which comprises at least one ionic liquid, wherein the anion of the ionic liquid(s) is selected from: a halide anion chosen from the group consisting of fluoride (F$^-$), chloride (Cl$^-$), bromide (Br$^-$), iodide (I$^-$) and astatide (At$^-$); a phosphate; a nitrite; a nitrate; sulfate; a hydrogensulfate; a carbonate; a hydrogencarbonate; a phosphonate; a phosphinate; a sulfonate; a carboxylate; an imide; a methide and mixtures thereof; and wherein the electrolyte consists of the ionic liquid.

2. The redox flow battery of claim 1, wherein both half-cells of the redox flow battery comprise an ionic liquid and the ionic liquids may be the same or different.

3. The redox flow battery of claim 2, wherein the cation of the ionic liquid(s) is selected from imidazolium, pyridinium, pyrazolium, quinolinium, thiazolium, triazinium, pyrrolidinium, phosphonium, ammonium, sulphonium and mixtures thereof.

4. The redox flow battery of claim 1, wherein the cation of the ionic liquid is selected from imidazolium, pyridinium, pyrazolium, quinolinium, thiazolium, triazinium, pyrrolidinium, phosphonium, ammonium, sulphonium and mixtures thereof.

5. The redox flow battery of claim 4, wherein the redox pair for the positive half-cell is selected from the group consisting of: $V^{4+}/V^{5+}$, $F_2/F^-$, $O_2/O^{2-}$, $O_3/O_2$, $Ag^{2+}/Ag^+$, $Co^{3+}/Co^{2+}$, $N_2O/N_2$, $Ce^{4+}/Ce^{3+}$, $Au^+/Au$, $Mn^{7+}/Mn^{4+}$, $Ni^{4+}/Ni^{2+}$, $Mn^{3+}/Mn^{2+}$, $Pb^{4+}/Pb^{2+}$, $Au^{3+}/Au^+$, $Cl_2/Cl^-$, $Tl^{3+}/Tl^{2+}$, $Mn^{4+}/Mn^{2+}$, $Cu^{2+}/Cu^+$, $Pu^{5+}/Pu^{4+}$, $Br_2/Br^-$, $I^{5+}/I^-$, $Fe^{3+}/Fe^{2+}$, $Pu^{4+}/Pu^{3+}$, $Hg^{2+}/Hg_2^{2+}$, $Hg^{2+}/Hg$, $U^{5+}/U^{4+}$, $Ag^{2+}/Ag^+$, $V^{4+}/V^{3+}$, $Ru^{3+}/Ru^{2+}$, $Sn^{4+}/Sn^{2+}$, $Cl_2/Cl^-$ and $I_2/I^-$.

6. The redox flow battery of claim 3, wherein the redox pair for the positive half-cell is selected from the group consisting of: $V^{4+}/V^{5+}$, $F_2/F^-$, $O_2/O^{2-}$, $O_3/O_2$, $Ag^{2+}/Ag^+$, $Co^{3+}/Co^{2+}$, $N_2O/N_2$, $Ce^{4+}/Ce^{3+}$, $Au^+/Au$, $Mn^{7+}/Mn^{4+}$, $Ni^{4+}/Ni^{2+}$, $Mn^{3+}/Mn^{2+}$, $Pb^{4+}/Pb^{2+}$, $Au^{3+}/Au^+$, $Cl_2/Cl^-$, $Tl^{3+}/Tl^{2+}$, $Mn^{4+}/Mn^{2+}$, $Cu^{2+}/Cu^+$, $Pu^{5+}/Pu^{4+}$, $Br_2/Br^-$, $I^{5+}/I^-$, $Fe^{3+}/Fe^{2+}$, $Pu^{4+}/Pu^{3+}$, $Hg^{2+}/Hg_2^{2+}$, $Hg^{2+}/Hg$, $U^{5+}/U^{4+}$, $Ag^{2+}/Ag^+$, $V^{4+}/V^{3+}$, $Ru^{3+}/Ru^{2+}$, $Sn^{4+}/Sn^{2+}$, $Cl_2/Cl^-$ and $I_2/I^-$.

7. The redox flow battery of claim 6, wherein the redox pair for the negative half-cell is selected from the group consisting of: $V^{3+}/V^{2+}$, $Np^{4+}/Np^{3+}$, $Sn^{4+}/Sn^{2+}$, $Sr^{2+}/Sr$, $Ba^{2+}/Ba$, $Ce^{3+}/Ce$, $Zn^{2+}/Zn$, $As^{5+}/As^{3+}$, $U^{4+}/U^{3+}$, $Sb^{5+}/Sb^{3+}$, $S^{4+}/S^{2+}$, $Ti^{4+}/Ti^{2+}$, $In^{3+}/In^{2+}$, $Ni^{4+}/Ni^{2+}$, $S/S^{2-}$, $Cr^{3+}/Cr^{2+}$, $In^{2+}/In^+$, $Ti^{3+}/Ti^{2+}$, $Eu^{3+}/Eu^{2+}$, $Pb^{2+}/Pb$, $Tl^+/Tl$, $Ti^{4+}/Ti^{3+}$, $Na^+/Na$, $Li^+/Li$, $K^+/K$, $Mg^+/Mg$, $Mg^{2+}/M$, $Ca^+/Ca$, $Ca^{2+}/Ca$, $Sr^+/Sr$ and $Be^{2+}/Be$.

8. The redox flow battery of claim 5, wherein the redox pair for the negative half-cell is selected from the group consisting of: $V^{3+}/V^{2+}$, $Np^{4+}/Np^{3+}$, $Sn^{4+}/Sn^{2+}$, $Sr^{2+}/Sr$, $Ba^{2+}/Ba$, $Ce^{3+}/Ce$, $Zn^{2+}/Zn$, $As^{5+}/As^{3+}$, $U^{4+}/U^{3+}$, $Sb^{5+}/Sb^{3+}$, $S^{4+}/S^{2+}$, $Ti^{4+}/Ti^{2+}$, $In^{3+}/In^{2+}$, $Ni^{4+}/Ni^{2+}$, $S/S^{2-}$, $Cr^{3+}/Cr^{2+}$, $In^{2+}/In^+$, $Ti^{3+}/Ti^{2+}$, $Eu^{3+}/Eu^{2+}$, $Pb^{2+}/Pb$, $Tl^+/Tl$, $Ti^{4+}/Ti^{3+}$, $Na^+/Na$, $Li^+/Li$, $K^+/K$, $Mg^+/Mg$, $Mg^{2+}/M$, $Ca^+/Ca$, $Ca^{2+}/Ca$, $Sr^+/Sr$ and $Be^{2+}/Be$.

9. The redox flow battery of claim 3, wherein the redox pair used for the positive half-cell is $V^{4+}/V^{5+}$, and the redox pair used for the negative half-cell is $V^{3+}/V^{2+}$.

10. The redox flow battery of claim 1, wherein the redox pair used for the positive half-cell is $V^{4+}/V^{5+}$, and the redox pair used for the negative half-cell is $V^{3+}/V^{2+}$.

11. The redox flow battery according to claim 9, wherein the redox flow battery's temperature is in the range from −30° C. to 400° C.

12. The redox flow battery of claim 9, wherein the concentration of the vanadium ions in the electrolyte is in the range from 0.1 mol/l to 10 mol/l.

13. The redox flow battery of claim 1, wherein the redox pair is formed by the ionic liquid in at least one half-cell of the redox flow battery.

14. The redox flow battery of claim 13, wherein the ionic liquid is in both half-cells of the redox flow battery.

15. The redox flow battery of claim 1, wherein the redox flow battery further comprises electrodes and each electrode is an electrode chosen from the group consisting of a metallic electrode, a diamond electrode and an indium tin oxide electrode.

16. The redox flow battery of claim 1, wherein the electrolyte does not contain any added stabilizers, acids, or bases.

17. The redox flow battery of claim 12, wherein the electrolyte does not contain any added stabilizers, acids, or bases.

* * * * *

UNITED STATES PATENT AND TRADEMARK OFFICE
CERTIFICATE OF CORRECTION

PATENT NO.        : 8,802,265 B2
APPLICATION NO.   : 13/201813
DATED             : August 12, 2014
INVENTOR(S)       : Noack et al.

Page 1 of 1

It is certified that error appears in the above-identified patent and that said Letters Patent is hereby corrected as shown below:

In the Claims

Column 10, claim 8, line 33, "$Mg^{2+}/M$" should be --$Mg^{2+}/Mg$--.

Signed and Sealed this
Seventh Day of April, 2015

Michelle K. Lee
*Director of the United States Patent and Trademark Office*